C. W. HARRISON.
DEVICE FOR CONTROLLING THE SUPPLY OF GAS TO BURNERS.
APPLICATION FILED FEB. 9, 1911.
1,155,416.
Patented Oct. 5, 1915.
5 SHEETS—SHEET 3.
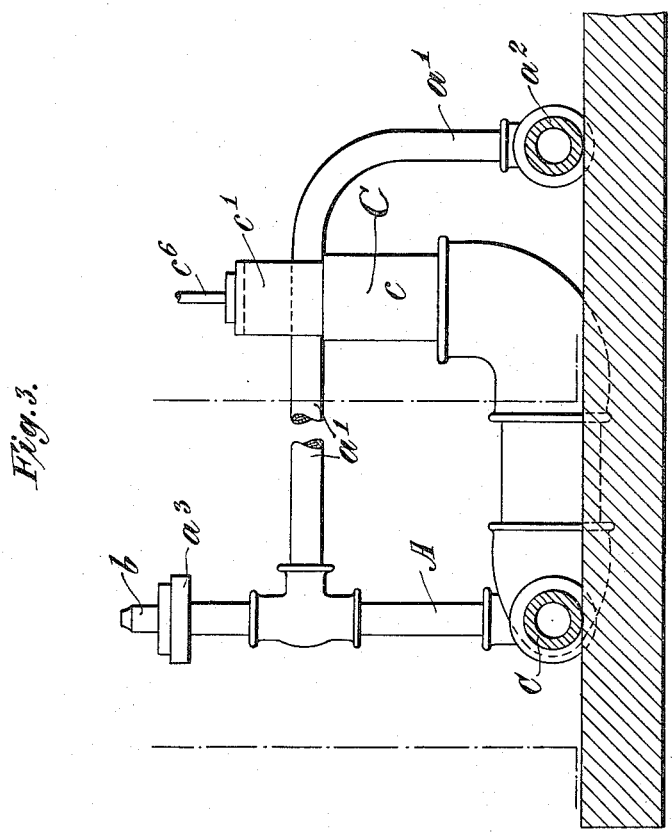

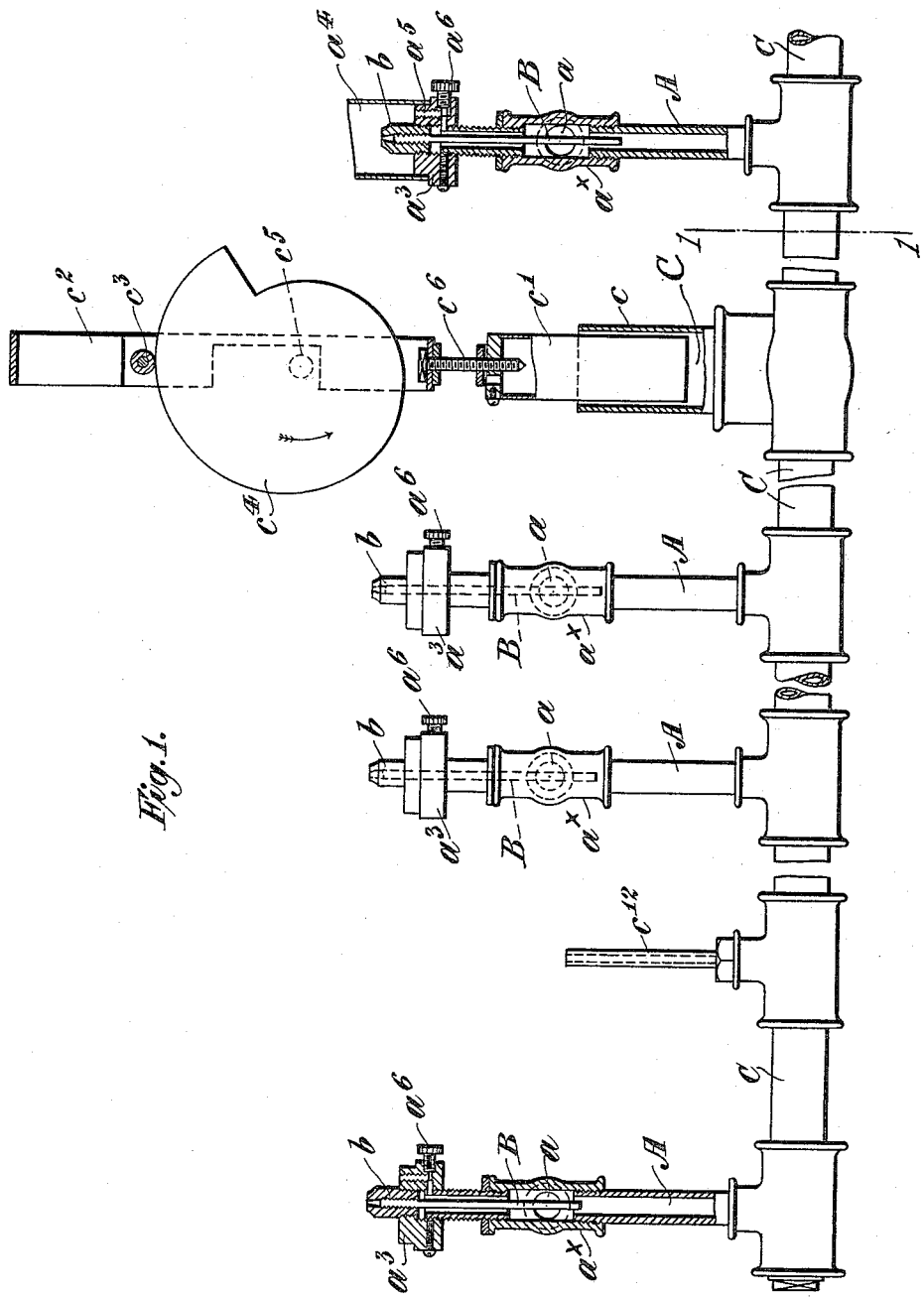

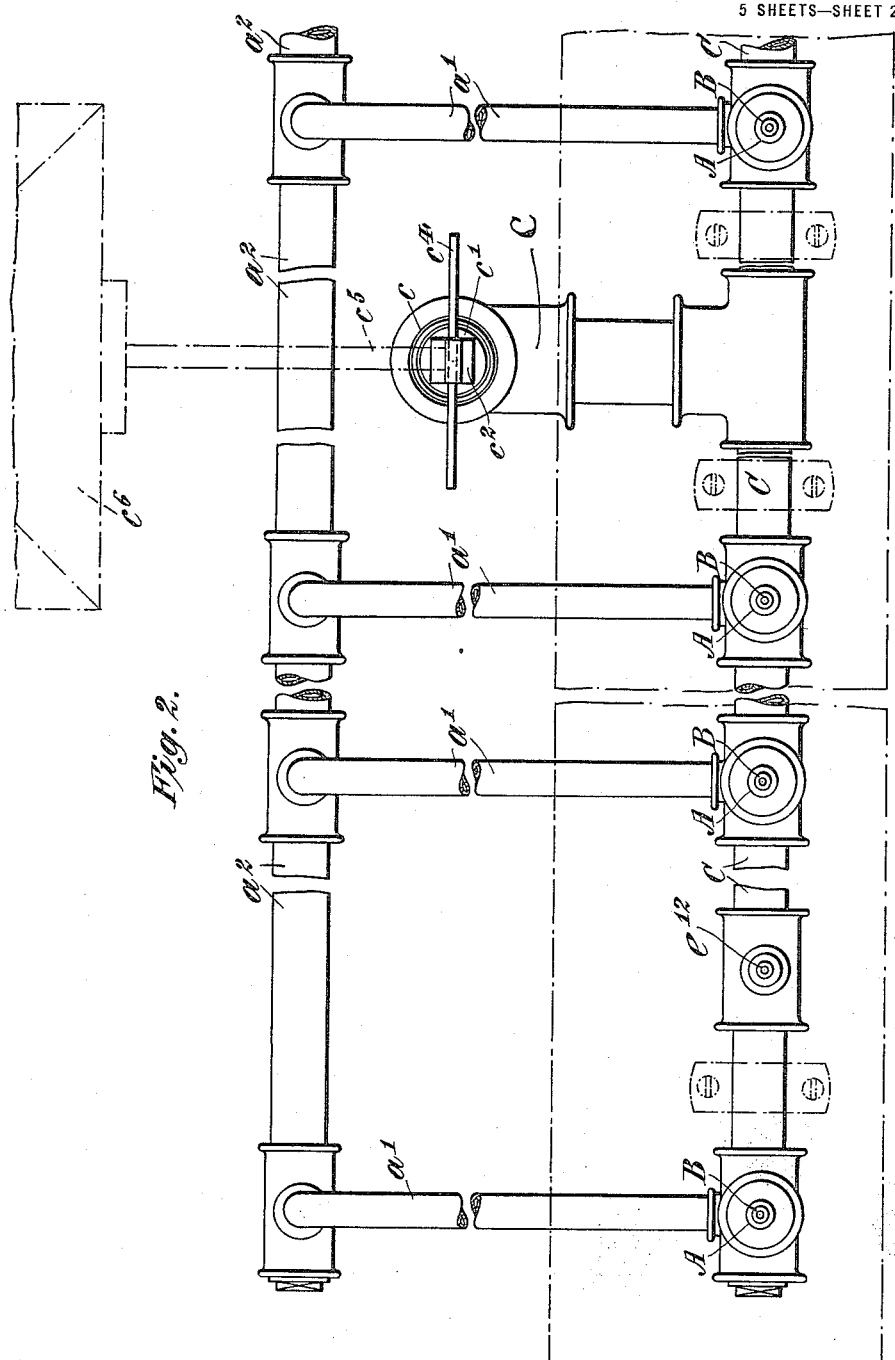

C. W. HARRISON.
DEVICE FOR CONTROLLING THE SUPPLY OF GAS TO BURNERS.
APPLICATION FILED FEB. 9, 1911.
1,155,416.
Patented Oct. 5, 1915.
5 SHEETS—SHEET 4.
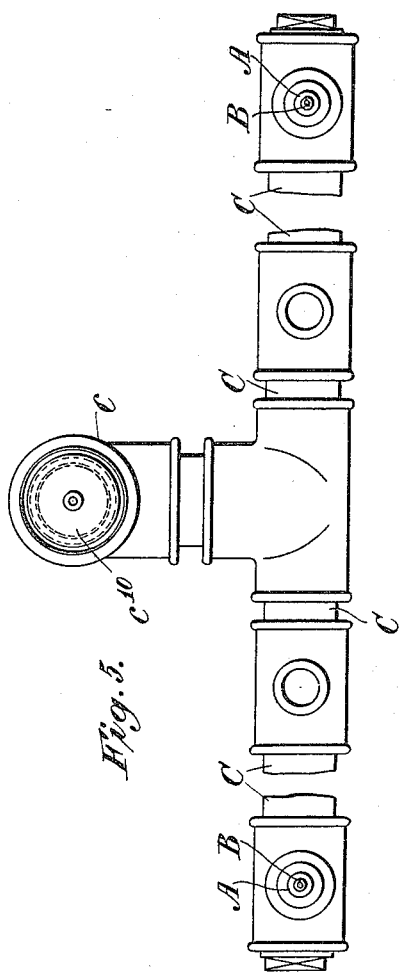
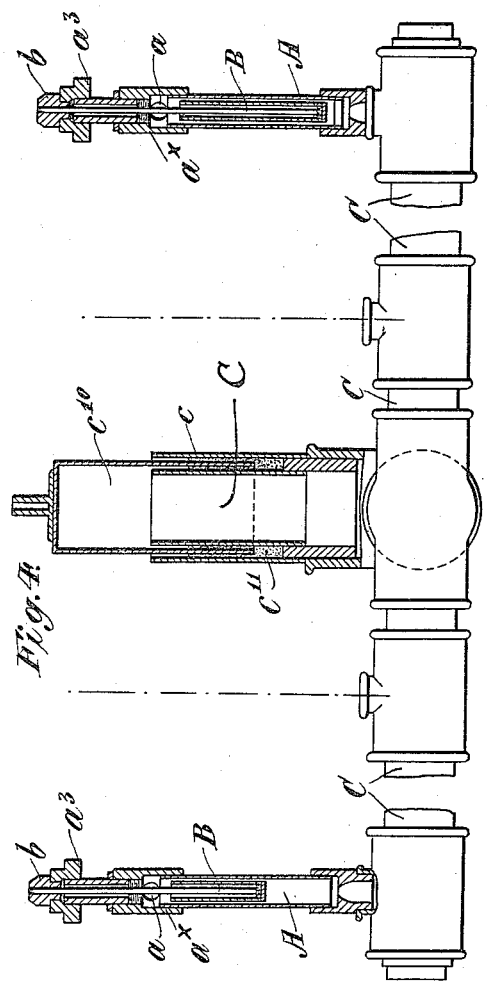

C. W. HARRISON.
DEVICE FOR CONTROLLING THE SUPPLY OF GAS TO BURNERS.
APPLICATION FILED FEB. 9, 1911.
1,155,416.
Patented Oct. 5, 1915.
5 SHEETS—SHEET 5.
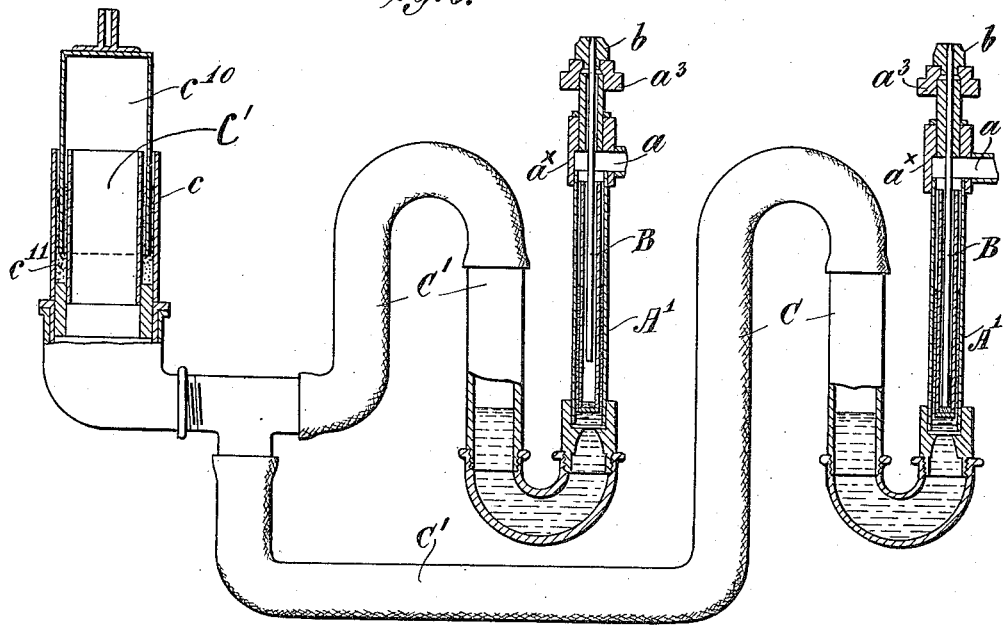
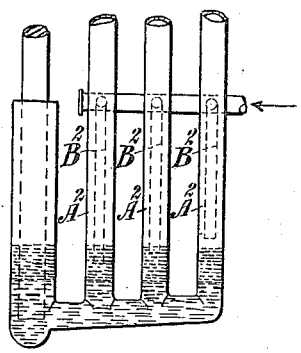

UNITED STATES PATENT OFFICE.

CLARK WAY HARRISON, OF NEW YORK, N. Y.

DEVICE FOR CONTROLLING THE SUPPLY OF GAS TO BURNERS.

1,155,416.  Specification of Letters Patent.  Patented Oct. 5, 1915.

Application filed February 9, 1911. Serial No. 607,568.

*To all whom it may concern:*

Be it known that I, CLARK WAY HARRISON, a citizen of the United States, and a resident of the city and State of New York, have invented certain new and useful Improvements in Devices for Controlling the Supply of Gas to Burners, of which the following is a specification, reference being made to the accompanying drawings, forming a part thereof.

The invention relates to a device for regulating and controlling the supply of gas to burners and particularly to such as automatically control the supply to burners that are used for "flash advertisements".

One phase of the invention relates to such a device in which the opening and closing of the passage for gas that is supplied to the burner is regulated by means of a rising and falling liquid that is subject to the control of a mechanical means comprising a movable member that causes or effects the rising and falling of the liquid.

In the embodiment of one form of my invention as disclosed in the drawings I employ a reciprocating plunger for acting upon the surface of a liquid seal or upon a column of fluid interposed between a liquid seal and the plunger or as disclosed in other forms I may employ a flexible or collapsible chamber. Movement is imparted to this plunger or the collapsible chamber by a rotary cam mounted on a spindle driven by a clock movement or other motor. Instead of a cam I may employ any other suitable device driven by the motor for actuating the plunger or collapsible chamber.

An important feature of my invention is that the liquid seal valves which control the passage of gas for the burners are contained in different chambers of small cross sectional area which communicate at or near their lower ends with a chamber or passage-way connecting means that is common to them all.

In the drawings which illustrate some practical embodiments of my invention, Figure 1 is a sectional elevation. Fig. 2 is a plan of the device illustrated in Fig. 1. Fig. 3 is a partial transverse section on the line 1—1 of Fig. 1. Fig. 4 is a sectional elevation showing a modified form. Fig. 5 is a plan of the modification shown in Fig. 4. Fig. 6 is a sectional elevation of another modified form, and Fig. 7 shows a modification in which the incoming gas passes through the short inner tubes and supplies gas to the outer tubes carrying the burners.

Like reference characters indicate similar parts in all the figures and throughout the body of the specification.

Referring first particularly to Figs. 1 to 5, A A are the different chambers of small sectional area and B B are the short tubes contained therein.

The chambers A are in the examples shown composed of vertically arranged tubes which at their lower ends communicate with and are supported by a chamber C or passage-way connecting means of tubular formation which is common to all of said vertical tubes. These tubes A have lateral apertures or branches $a$ which communicate by means of pipes $a'$ with a tubular chamber $a^2$ arranged parallel to the tubular chamber A and communicating with the gas main. The short tubes B B terminate at their upper ends in gas nozzles $b$ which are supported at the upper ends of the vertical tubes A by collars $a^3$ that carry the Bunsen burner tubes $a^4$ (Fig. 1) and the burner heads and mantles as is well understood in connection with the incandescent gas lighting. But it is obvious that instead of utilizing the construction shown in these figures the gas may be brought in through short tubes which are located within outer tubes of small cross sectional area which outer tubes are connected to the burners as illustrated for example in Fig. 7.

In the form shown in Fig. 6, A' A' are the different vertical chambers of small sectional area and B B are the short tubes which terminate at their upper ends in gas nozzles $b$. It will be observed that each of the vertically arranged chambers A' is provided with a U-shaped liquid seal and that one leg of each of the U-shaped seals is connected to and communicates with a common chamber C' having fluid therein for effecting the rising and falling of the liquid in the seal. For the sake of distinction the short tubes B will be hereinafter referred to as "short inner tubes," the surrounding vertical tubes A and A' as outer tubes and the chambers C and C' as the controlling fluid containing chamber.

The diameter of the short inner tubes is such that an annular space is left between them and the surrounding outer tubes. As already stated these short inner tubes are preferably of various lengths so that the extent to which they project downwardly in the outer tubes is different in the latter. The said liquid containing chamber C in the forms shown in Figs. 1 to 3 is provided with an upright limb $c$ which is open at its upper end for the reception of a plunger $c'$ which is made hollow for lightness. This plunger is connected with a rising and falling frame $c^2$ which has a roller $c^3$ by which it is supported upon the periphery of a rotary cam $c^4$. This cam is carried by the end of a shaft $c^5$ driven preferably by a clock movement or spring motor $c^6$. The cam is so shaped that during its revolution it will through the intervention of the roller $c^3$ gradually lift the frame $c^2$ and with it the plunger $c'$ until the latter reaches its highest position and will then suddenly release so that it will promptly descend to the lowest position within the limb $c$, this operation taking place at each revolution of the cam. The liquid containing chamber C, the various outer tubes A and the limb $c$ are charged with mercury or other appropriate liquid or fluids in such quantity that the level in the various outer tubes A lies slightly below the lower end of the longest short inner tube B when the plunger $c'$ is in its highest position and slightly above the lower end of the shortest short inner tube when the plunger is in its lowest position. It will of course be understood that when the plunger $c'$ is in its lowest position it displaces the mercury in the limb $c$ and causes the level in all the outer tubes A to rise and close the lower ends of the short inner tubes B in succession, thereby cutting off the gas supply to the various burners and extinguishing them one by one. The continued movement of the cam gradually raises the plunger so that the level of the mercury falls in the different outer tubes A and thus uncovers the lower ends of the short inner tubes B in succession, whereby the burners are one by one re-ignited by their pilot flames, or other automatic lighting device such as platinum black etc.

An important advantage arising out of my invention is that only a comparatively small quantity of mercury is required to be used with the apparatus, so that the primary cost of installation of the apparatus is reduced. Also that as only a small volume of the mercury has to be displaced by the plunger $c'$, the power required for driving the apparatus is small and enables the working to be effected by any simple and inexpensive form of motor such as a clock-movement or spring motor.

In order to permit of the amount of mercury displaced by the plunger $c'$ to be controlled, the connection of the said plunger with the frame $c^2$ is effected through the intervention of an adjustable device comprising a screw threaded stem $c^6$, by turning which in one or other direction, the plunger can be raised or lowered relatively to the frame. Each of the short inner tubes B also may be made capable of adjustment for regulating the position of its lower end relatively to the level of the mercury in the outer tubes A, so that the intervals of time existing between the ignition and extinguishing of the various burners may be controlled. For this purpose the outer tubes are made in two lengths joined together by screw threaded union pieces $a^x$ in which the aforesaid lateral gas supplying apertures $a$ are formed. By revolving the upper lengths of the outer tubes relatively to the screw threaded union pieces $a^x$, the short inner tubes B can be raised or lowered within the gas supply tubes. This mode of adjustment would not be feasible if the by-pass pipes supplying gas to the pilot flames were connected with the gas supply tubes A, and also with the Bunsen burner, I therefore connect the by-pass pipes to the collars $a^3$ which are formed with passages $a^5$ controlled by the adjustable needle valves $a^6$.

In the modification of the device or apparatus shown by Figs. 4 and 5 the limb $c$ of the liquid containing chamber C is constructed in the form of a collapsible chamber by providing it with an inverted cylinder or cap $c^{10}$ whose open end dips into an annular space $c^{11}$ (Fig. 4) surrounding the mouth of the limb $c$ and containing mercury. The liquid containing chamber C is in this modification charged with water or other fluid less expensive than mercury, the level of which is varied by the rise and fall of the inverted cylinder or cap $c^{10}$ causing the pressure of the air contained therein to be varied. The movement of the inverted cylinder or cap $c^{10}$ is effected by a frame and cam similar to that above described with reference to Figs. 1 to 3 and the connection of the inverted cylinder or cap with the said frame may also be through an adjustable screw $c^6$ as in that arrangement. In this case each of the short inner tubes dips into a tubular float valve which is open at its bottom which serves as a liquid seal for covering and uncovering the gas nozzle tubes as the said tubular float valves rise and fall by the change in level of the water or other liquid within the various outer tubes A. The upper ends of the said tubular float valves are open to the gas supply which reaches the tubes A through the lateral openings $a$ as in the arrangement already described with reference to Figs. 1 to 3. The mercurial float valves are necessary when water or other liquid lighter than mercury is employed, otherwise the gas pressure would force the water too far up the short inner tubes B when the liquid seals were closed except in the modification shown in Fig. 7 in which the water would have to cover the short inner tube for some distance to overcome the gas pressure.

In installing the apparatus as shown in Figs. 1-5 it is necessary to know that the level of the liquid in the various outer tubes A is the same throughout, otherwise there would be a liability of some of the short inner tubes B failing to be sealed or unsealed when the plunger or the collapsible chamber was operated. For this purpose I provide the liquid containing chamber C near its opposite ends with gages in the form of vertical transparent tubes $c^{12}$ which may be graduated, so that by inspecting the level of the liquid in these two tubes, it can readily be ascertained when the level of the liquid is even throughout the apparatus.

Although I have shown the aforesaid collapsible chamber as comprising an inverted cylinder or cap $c^{10}$ movable up and down in the limb $c$, I wish it to be understood that I do not confine myself to that form of collapsible chamber. For instance I may make the upper part of the limb $c$ flexible like a concertina and control its expansion and contraction by the aforesaid frame $c^2$ and cam $c^4$.

In the form shown in Fig. 6 the outer tubes A' are provided with U-shaped liquid seals. In one leg of each seal there is preferably supported a mercury float valve similar to that shown in Figs. 4 and 5 previously described. The other leg of each of the seals is connected to a common chamber or passage-way connecting means which contains therein a fluid, preferably air. It will be apparent that by raising and lowering the movable member $c^{10}$ by any suitable mechanism the position of the liquid in the U-shaped seal can be varied so as to control the flow of gas to the burners.

In the form shown in Fig. 7 the gas enters the device through the short inner tubes $B^2$ and passes to the outer tubes $A^2$ on its way to the burner. While the construction is the reverse of that shown in the other figures still the underlying principle is the same.

It is obvious that various other forms and modifications may be made without departing from the spirit and scope of my invention.

I claim as my invention:

1. A flashlight advertising device having in combination a series of gas burners each provided with a separate liquid-seal-valve to control their gas supply, the liquid-seal-valves being contained in separate chambers which communicate with a chamber that is common to all of them, and continuously operated mechanical means for varying the pressure on a fluid in said common chamber, thereby effecting automatically the periodic opening and closing of the said liquid-seal-valves.

2. A flashlight advertising device having in combination a series of gas burners each provided with a separate liquid-seal-valve to control their gas supply, the liquid-seal-valves being contained in separate chambers which communicate with a chamber that is common to all of them, and continuously operated mechanical means for varying the pressure on a fluid in said common chamber, effecting automatically the periodic successive lighting and extinguishing of said burners, and means for relatively timing the successive lighting of said burners.

This specification signed and witnessed this 8th day of February, A. D., 1911.

CLARK WAY HARRISON.

Signed in the presence of—
G. McGrann,
Edwin A. Packard.

Copies of this patent may be obtained for five cents each, by addressing the "Commissioner of Patents, Washington, D. C."